US012698933B2

(12) United States Patent
Truong et al.

(10) Patent No.: US 12,698,933 B2
(45) Date of Patent: Aug. 4, 2026

(54) SMART LOCK BOX

(71) Applicants: Christopher Truong, College Point, NY (US); Venkat Cherukupalli, Belle Mead, NJ (US)

(72) Inventors: Christopher Truong, College Point, NY (US); Venkat Cherukupalli, Belle Mead, NJ (US)

( * ) Notice: Subject to any disclaimer, the term of this patent is extended or adjusted under 35 U.S.C. 154(b) by 463 days.

(21) Appl. No.: 18/328,813

(22) Filed: Jun. 5, 2023

(65) Prior Publication Data

US 2023/0400244 A1 Dec. 14, 2023

Related U.S. Application Data

(60) Provisional application No. 63/366,189, filed on Jun. 10, 2022.

(51) Int. Cl.
*F25D 23/02* (2006.01)
*A47G 29/14* (2006.01)
(Continued)

(52) U.S. Cl.
CPC ......... *F25D 23/025* (2013.01); *A47G 29/141* (2013.01); *A47G 29/20* (2013.01);
(Continued)

(58) Field of Classification Search
CPC .................. A47G 29/141; A47G 29/20; A47G 2029/1226; A47G 2029/145–147;
(Continued)

(56) References Cited

U.S. PATENT DOCUMENTS 4,316,404 A 2/1982 Medlin
6,426,699 B1 * 7/2002 Porter ..................... A47F 10/00 340/568.1

(Continued)

FOREIGN PATENT DOCUMENTS

CN 104106041 B 10/2014
CN 104622245 A 5/2015

(Continued)

OTHER PUBLICATIONS

"iParcelBox", retrieved on Jun. 1, 2023 from the Internet URL: <https://www.iparcelbox.com/product/iparcelbox-v2-battery/>, 6 pgs.

(Continued)

*Primary Examiner* — William L Miller
(74) *Attorney, Agent, or Firm* — HESLINGTON ROTHENBERG FARLEY & MESITI P.C.

(57) ABSTRACT

A lock box system includes a bottom base. A rear section extends upwards from the base. A side wall cover removably abuts against a perimeter of the base and opposing sides of the rear section. The cover is pivotally attached to an upper portion of the rear section. A locking mechanism is operable to lock the cover to the rear section. A top lid is sized to removably fit over the cover. The lid is pivotally attached to the upper portion of the rear section. The base, rear section, cover and lid define an interior of the lock box system, which is sized to receive packages. The lid is operable to pivotally open automatically to receive a package within the interior. The locking mechanism is operable to unlock automatically to enable the cover to pivotally open to allow a user access to the package within interior.

20 Claims, 5 Drawing Sheets

(51) Int. Cl.

| | |
|---|---|
| ***A47G 29/20*** | (2006.01) |
| ***E05B 17/22*** | (2006.01) |
| ***E05B 47/00*** | (2006.01) |
| ***E05F 15/73*** | (2015.01) |
| ***F25D 11/00*** | (2006.01) |
| *A47G 29/122* | (2006.01) |

(52) U.S. Cl.
CPC .............. *E05B 17/22* (2013.01); *E05B 47/00* (2013.01); *E05F 15/73* (2015.01); *F25D 11/003* (2013.01); *F25D 23/026* (2013.01); *A47G 2029/1226* (2013.01); *A47G 2029/145* (2013.01); *A47G 2029/146* (2013.01); *A47G 2029/147* (2013.01); *E05B 2047/0095* (2013.01); *E05Y 2999/00* (2024.05)

(58) Field of Classification Search
CPC .... F25D 23/025; F25D 23/026; F25D 11/003; E05F 15/73; E05B 17/22; E05B 47/00; E05B 2047/0095; E05Y 2999/00; F25B 21/02; F25B 27/002
See application file for complete search history.

(56) References Cited

U.S. PATENT DOCUMENTS

| | | | | |
|---|---|---|---|---|
| 9,211,025 | B1 | 12/2015 | Elhawwashy | |
| 9,861,221 | B2 | 1/2018 | Jiang | |
| 10,039,401 | B1 * | 8/2018 | Romanucci | A47G 29/141 |
| 10,292,519 | B1 | 5/2019 | Sutton et al. | |
| 10,772,450 | B2 * | 9/2020 | Waisanen | G07C 9/00912 |
| 11,103,096 | B1 | 8/2021 | Parr et al. | |
| 11,166,580 | B2 | 11/2021 | Waisanen | |
| 11,172,776 | B1 * | 11/2021 | Logan | G08B 13/14 |
| 11,187,013 | B1 | 11/2021 | Jonak et al. | |
| 11,324,350 | B1 * | 5/2022 | Boggs | B65D 81/24 |
| 11,506,445 | B2 * | 11/2022 | Lubben | F25D 23/12 |
| 11,583,123 | B2 * | 2/2023 | Rodgers | A47G 29/141 |
| 11,672,371 | B1 * | 6/2023 | Paulo | G06Q 10/0836 340/568.1 |
| 11,928,642 | B2 * | 3/2024 | Ruocco | G07C 9/00896 |
| 12,004,671 | B2 * | 6/2024 | Foster | A61L 2/202 |
| 12,016,479 | B1 * | 6/2024 | Preston | G07C 9/0069 |
| 12,424,050 | B2 * | 9/2025 | Ecton | G07F 17/13 |
| 12,430,977 | B2 * | 9/2025 | Ecton | G07F 17/12 |
| 2001/0045449 | A1 | 11/2001 | Shannon | |
| 2008/0067227 | A1 | 3/2008 | Poss et al. | |
| 2013/0147626 | A1 | 6/2013 | Hammoud | |
| 2017/0091710 | A1 | 3/2017 | Van Dyke | |
| 2017/0286905 | A1 * | 10/2017 | Richardson | G06Q 10/0836 |
| 2018/0029760 | A1 * | 2/2018 | Maser | B65D 43/16 |
| 2018/0070753 | A1 * | 3/2018 | Eveloff | H04W 4/025 |
| 2018/0177319 | A1 | 6/2018 | Willis et al. | |
| 2018/0225628 | A1 | 8/2018 | Roy | |
| 2019/0147559 | A1 | 5/2019 | Lee et al. | |
| 2019/0177089 | A1 | 6/2019 | Benefield | |
| 2019/0333302 | A1 | 10/2019 | Kagnew et al. | |
| 2019/0362575 | A1 | 11/2019 | Nallaperumal et al. | |
| 2019/0387910 | A1 | 12/2019 | Stoich | |
| 2020/0005238 | A1 | 1/2020 | Richardson et al. | |
| 2020/0138225 | A1 | 5/2020 | Martin | |
| 2020/0163480 | A1 * | 5/2020 | Waisanen | E05B 65/06 |
| 2020/0392756 | A1 | 12/2020 | Bunger | |
| 2021/0005033 | A1 | 1/2021 | Roman et al. | |
| 2021/0045563 | A1 * | 2/2021 | Bartley-Clark | A47G 29/141 |
| 2021/0059455 | A1 * | 3/2021 | Bowman | B65D 81/18 |
| 2021/0059456 | A1 | 3/2021 | Fontanilla | |
| 2021/0148157 | A1 | 5/2021 | Muniz et al. | |
| 2021/0196071 | A1 * | 7/2021 | Gecho | A47G 29/30 |
| 2021/0298507 | A1 * | 9/2021 | Grijalva | A47G 29/20 |
| 2021/0321807 | A1 * | 10/2021 | Needler | G07C 9/00912 |
| 2022/0142388 | A1 * | 5/2022 | Foster | A47G 29/141 |
| 2022/0240704 | A1 * | 8/2022 | Castagno | A47G 29/1209 |
| 2022/0338658 | A1 * | 10/2022 | Soderberg | A47G 29/141 |
| 2023/0074283 | A1 * | 3/2023 | Malcolm | G06Q 10/0836 |
| 2023/0264871 | A1 * | 8/2023 | Williams | A47G 29/141 340/5.7 |
| 2023/0371729 | A1 * | 11/2023 | Williams | G07C 9/00896 |
| 2025/0024977 | A1 * | 1/2025 | Sundaresan | G08B 13/1463 |
| 2025/0261778 | A1 * | 8/2025 | Marrone | A47G 29/20 |
| 2025/0331669 | A1 * | 10/2025 | Roane, III | A47G 29/141 |

FOREIGN PATENT DOCUMENTS

| | | | | |
|---|---|---|---|---|
| CN | 107491917 | A | 12/2017 | |
| CN | 109051306 | A | 12/2018 | |
| CN | 111080846 | A | 4/2020 | |
| CN | 111920282 | A | 11/2020 | |
| DE | 202011101134 | U1 | 8/2011 | |
| EP | 3473142 | A1 | 4/2019 | |
| GB | 2353068 | A | 2/2001 | |
| KR | 20160093662 | A | 8/2016 | |
| KR | 102166299 | B1 | 10/2020 | |
| KR | 20210070785 | A | 6/2021 | |
| WO | 2019143868 | A2 | 7/2019 | |
| WO | 2020256278 | A1 | 12/2020 | |
| WO | 2022005289 | A1 | 1/2022 | |
| WO | WO-2024150837 | A2 * | 7/2024 | A61J 1/165 |

OTHER PUBLICATIONS

"Intelligent Parcel Lockers", retrieved on Jun. 1, 2023 from the Internet URL: <https://www.mobiikey.com/intelligent-locker-box-solutions/>, 11 pgs.

"Outdoor Parcel Locker", retrieved on Jun. 1, 2023 from the Internet URL: <https://www.china-elocker.com/item/outdoor-parcel-locker>, 7 pgs.

"Yale Smart Delivery Box with Wi-Fi—Package box for outdoor storage—Receive packages from any carrier and protect them from weather and porch pirates—Gray Medium", retrieved on Jun. 1, 2023 from the Internet URL: <https://www.amazon.com/gp/product/B0876XGP3Q/ref=as_li_tf_tl?ie=UTF8&camp=1789&creative=9325&creativeASIN=B0876XGP3Q&SubscriptionId=&linkCode=as2&tag=bestprodtag<139574-20>, 9 pgs.

"BoxLock Smart Lock", retrieved on Jun. 1, 2023 from the Internet URL: <https://www.amazon.com/BoxLock-Package-Delivery-Lock-Packages/dp/B07MXYTT6N/ref=sr_1_6?gclid=EAlalQobChMlkcfaw5SK9glVKwWICR1CRwi9EAAYASAAEgIt_ID_BwE&hvadid=418722163165&hvdev=c&hvlocphy=9001685&hvnetw=g&hvqmt=e&hvrand=10908376929000016179&hvtargid=kwd-300355076542&hydadcr-8433_9618934&keywords=delivery+box+lock&gid=1645218518&sr=8-6>, 7 pgs.

* cited by examiner

SMART LOCK BOX

CROSS REFERENCE TO RELATED APPLICATIONS

The present application is a non-provisional of, and claims the benefit of the filing date of, U.S. provisional application 63/366,189, filed Jun. 10, 2022, entitled, “SMART LOCK BOX,” the contents of which are incorporated herein by reference.

TECHNICAL FIELD

The present disclosure relates to lock boxes. More specifically, the disclosure relates to smart lock boxes for receipt of packages or envelopes from a courier.

BACKGROUND

Lock boxes are used as the final point of delivery to a user of packages or envelopes via various mail delivery services around the world. However, such lock boxes are often subject to a variety of security and logistic issues.

For example, current lock boxes are often subject to theft, or have limited capabilities to identify an unauthorized or authorized package delivery, or to alert the user of the delivery of a package. Additionally, current lock boxes may take an undue amount of time for a courier to unlock and/or relock, or the courier may not remember to relock the lock box once a package has been delivered.

Also, by way of example, the interiors of such current lock boxes may get very hot. In warm climates especially, a lock box’s interior may get hot enough to damage the goods that are being delivered.

Moreover, large packages, which have overall dimensions that are sufficiently or substantially close to the interior dimensions of a current lock box, and therefore are barely able to fit into such current lock boxes, may be difficult to remove by an end user. In other words, the lid or opening of the lock box may be large enough to receive such a large package, but once the package is placed withing the interior of the lock box, a user may not be able to easily fit his or her hands between the interior walls of the lock box and the package to conveniently grip and/or remove the package from the lock box. This may especially be the case when the package contains an item of significant weight.

Accordingly, there is a need for a lock box or lock box system that can help to resolve the above issues.

BRIEF DESCRIPTION

The present disclosure offers advantages and alternatives over the prior art by providing a smart lock box system. The lock box system includes a smart lock box that can identify a package and alert a user/recipient of the packages delivery. Further, the lock box system includes a control system application, which is installable on a variety of mobile devices, that provides a user with remote control of the lock box.

The lock box system may sense the approach of a courier, identify the package to be delivered, unlock and open the lock box to receive a package, and then close and lock the lock box upon placement of the package within the interior of the lock box, all without a courier having to touch the lock box. Further the lock box of the lock box system may insulate or actively cool the enclosed interior of the lock box to prevent overheating of goods placed in the lock box. The lock box additionally enables easy access to large packages having overall dimensions, which are significantly close to the dimensions of the interior of the lock box.

An example of a lock box system in accordance with one or more aspects of the present disclosure includes a lock box. The lock box includes a base having a bottom floor of an enclosed interior of the lock box. A rear section extends upwards from the base. The rear section has first and second opposing sides. A side wall cover removably abuts against a perimeter of the floor of the base. The cover also removably abuts against the first and second opposing sides of the rear section. The cover is pivotally attached to an upper portion of the rear section. A cover locking mechanism is operable to lock the cover to the base and the rear section. A top lid is sized to removably fit over a top portion of the cover. The lid is also pivotally attached to the upper portion of the rear section. A lid locking mechanism is operable to lock the top lid to the cover. The base, rear section, side wall cover and lid define the enclosed interior of the lock box of the lock box system. The interior is configured to receive packages therein. Upon receipt of a lid unlock signal by the lock box system, the lid locking mechanism is operable to unlock automatically and the lid is operable to pivotally open automatically to enable a courier to place a package within the interior without the courier having to touch the lid. Upon receipt of a cover unlock signal by the lock box system, the cover locking mechanism is operable to unlock automatically to enable the cover to be pivotally opened to enable a user to access the package within the interior.

Another example of a lock box system in accordance with one or more aspects of the present disclosure includes a lock box. The lock box includes a rectangular base having a bottom floor of an enclosed interior of the lock box. A rear section extends upwards from the base. The rear section has first and second opposing sides. A side wall cover includes three side walls integrally connected together. The cover removably abuts against a perimeter of the floor of the base. The cover also removably abuts against the first and second opposing sides of the rear section. The cover is pivotally attached to an upper portion of the rear section. A cover locking mechanism is operable to lock the cover to the base and the rear section. A top lid is sized to removably fit over a top portion of the cover. The lid is also pivotally attached to the upper portion of the rear section. A lid locking mechanism is operable to lock the top lid to the cover. The base, rear section, side wall cover and lid define the enclosed interior of the lock box of the lock box system. The interior is configured to receive packages therein. Upon receipt of a cover unlock signal by the lock box system, the cover locking mechanism is operable to unlock automatically to enable the cover to be pivotally opened to enable a user to access the package within the interior.

In some examples of the lock box system, upon placement of a package within the interior, the lid is operable to pivotally close automatically and the lid locking mechanism is operable to lock automatically to enable a courier to place a package within the interior without the courier having to touch the lid.

In some examples of the lock box system, the rear section includes first and second hinges disposed respectively on upper portions of the first and second opposing sides of the rear section. The lid and cover are both pivotally connected to the first and second hinges.

In some examples of the lock box system, the lid locking mechanism includes a motor. The motor is operable to automatically open the lid upon receipt of the lid unlock signal by the lock box system. In some examples of the lock box system, the motor may be a servo-motor or a stepper motor.

In some examples of the lock box system, the cover includes first and second locking tabs extending respectively from opposing rear sides of the cover. The first and second locking tabs are configured to slidably fit into first and second locking recesses disposed respectively on the first and second opposing sides of the rear section. The cover locking mechanism includes first and second opposing retractable locking pins. When the first and second locking tabs are fit within the first and second locking recesses, the first and second locking pins are operable to extend through thru-holes in the first and second locking recesses and to extend through thru-holes in the first and second locking tabs to lock the cover to the rear section and the base. Upon receipt of the cover unlock signal by the lock box system, the first and second locking pins are operable to retract from the thru-holes in the first and second locking tabs to unlock the cover from the rear section and the base.

In some examples of the lock box system, a bar code scanner is disposed on the lock box of the lock box system. The bar code scanner is operable to scan a bar code of a package and to generate a package identification signal based on the scanned bar code. A microprocessor is disposed within the interior of the lock box. The microprocessor is electrically connected to the bar code scanner. The microprocessor is operable to receive the package identification signal and to generate the lid unlock signal based on the package identification signal.

In some examples of the lock box system, a radio transmitter is disposed within the interior of the lock box. The radio transmitter is electrically connected to the microprocessor. A computerized mobile device, such as a cell phone, has a memory. A control system application is installed within the memory of the mobile device and operable by the user. The control system application is operable to establish a communications link between the control system application, the radio transmitter and the microprocessor. Upon a command from the user, the control system application is operable to transmit the cover unlock signal to the microprocessor to unlock the cover. In some examples of the lock box system, the radio transmitter may be a Bluetooth transmitter and receiver.

In some examples of the lock box system, a motion sensor is disposed on the lock box and electrically connected to the microprocessor. The motion sensor communicates with the control system application to alert the user of the presence of a courier within a proximity of the lock box.

In some examples of the lock box system, a camera is disposed on the lock box and electrically connected to the microprocessor. The camera communicates with the control system application to provide the user with a picture of a courier within a proximity of the lock box.

In some examples of the lock box system, the lock box is insulated. In some examples of the lock box system, the base, rear section, side wall cover and lid are insulated.

In some examples of the lock box system, an active cooling system is disposed on the lock box. The active cooling system actively regulates the temperature of the enclosed interior of the lock box. In some examples of the lock box system, the active cooling system includes a Peltier thermoelectric cooling module. In some examples of the lock box system, the Peltier thermoelectric cooling module is solar powered.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms “significantly”, “substantially”, “approximately”, “about”, “relatively,” or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
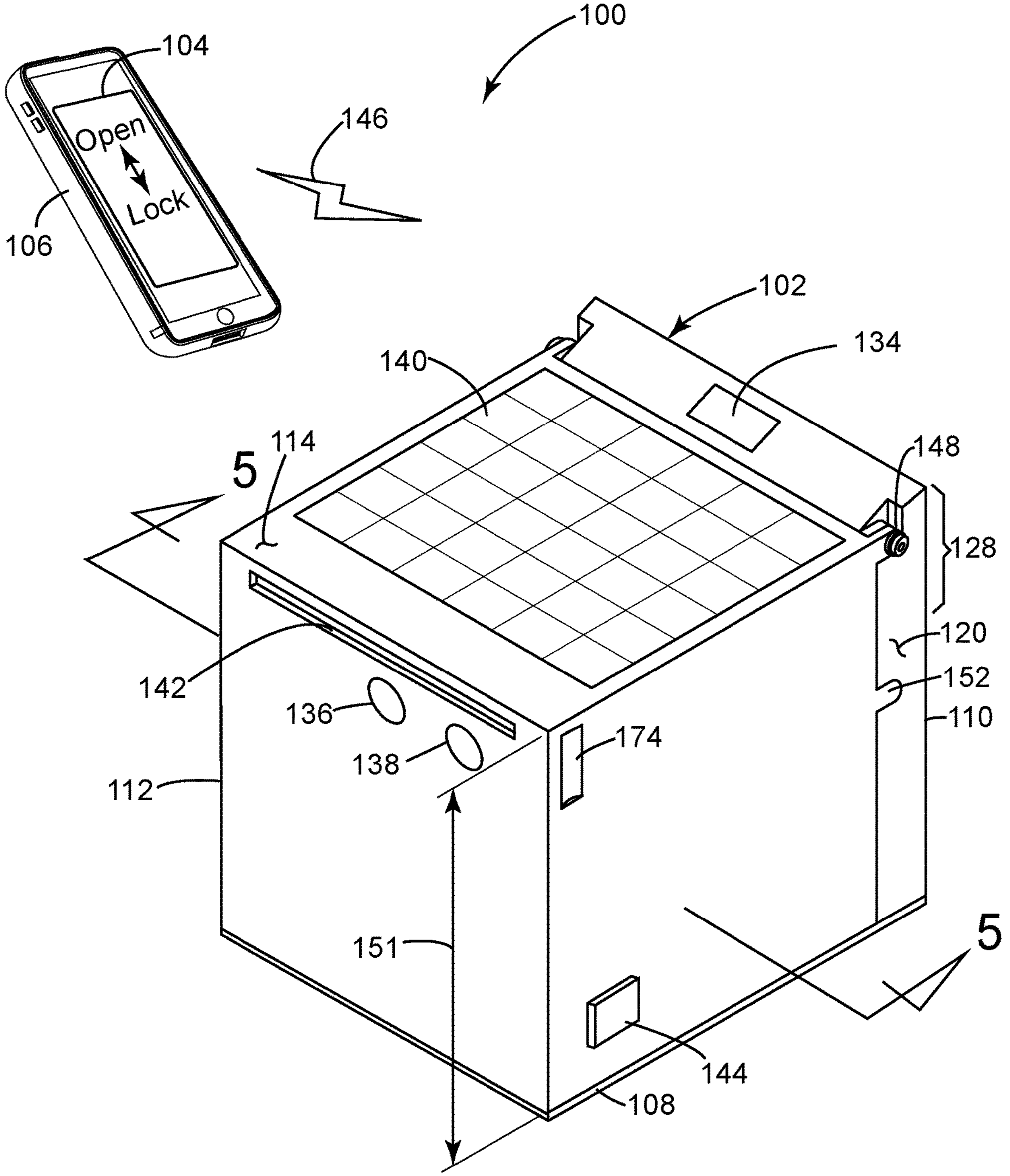
FIG. 1 depicts an example of a perspective view of a lock box system having a lock box and a control system application installed on a cell phone, according to aspects described herein.
Figure 2:
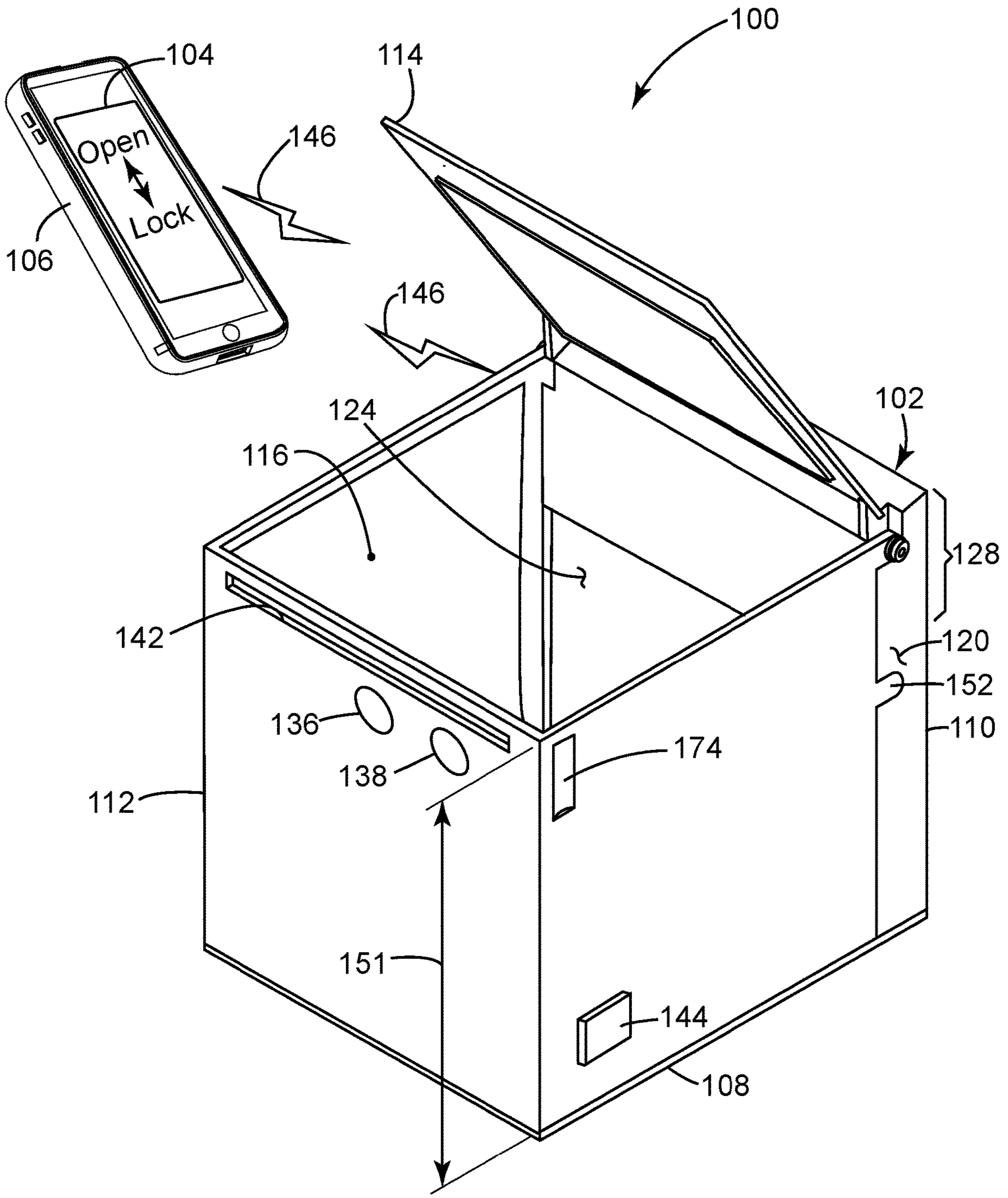
FIG. 2 depicts an example of a perspective view of the lock box system of FIG. 1, wherein the lock box has a top lid pivotally opened and an access panel installed, according to aspects described herein.

Referring to FIGS. 1 and 2, an example is depicted of a perspective view of a lock box system 100 having a lock box 102 and a control system application 104 installed in a memory of a cell phone 106 or other mobile device 106, according to aspects described herein. In FIG. 1, a lid 114 of the lock box 102 is shown in the closed position. In FIG. 2, the lid 114 of the lock box 102 is shown in the open position.

The lock box 102 of the lock box system 100 includes a base 108, a rear section 110, a side wall cover 112, a lid 114, which together define an enclosed interior 116 (see FIG. 2) of the lock box 102. The interior 116 of the lock box 102 is configured and sized to receive various packages (not shown) placed therein.

The base 108 in the examples illustrated herein is shown as generally rectangular in shape. However, the base may be any appropriate shape for the lock box 102. The base includes a bottom floor 118 of the enclosed interior 116 of the lock box 102.

The rear section 110 extends upwards from the base 108. The rear section 110 has a first side 120 and a second opposing side 122. The rear section 110 in this example also includes an access panel 124 (see FIG. 2), which covers a recessed instrument enclosure area 126 (see FIG. 3) embedded within the rear section 110.

The side wall cover 112 removably abuts against a perimeter of the floor 118 of the base 102. The cover 112 also removably abuts against the first and second opposing sides 120, 122 of the rear section 110. The cover 112 is pivotally attached to an upper portion 128 of the rear section 110. A cover locking mechanism 130 (see FIGS. 3 and 4) is operable to lock the cover 112 to the base 102 and the rear section 110.

The top lid 114 is sized to removably fit over a top portion of the cover 112. The lid 114 is also pivotally attached to the upper portion 128 of the rear section 110. A lid locking mechanism 132 (see FIGS. 3 and 4) is operable to lock and unlock the top lid 114 to the cover 112. When the lid 114 and cover 112 are locked, the enclosed interior 116 is locked closed.

Upon receipt of a lid unlock signal by the lock box system 100, the lid locking mechanism 132 is operable to unlock automatically and the lid 114 is operable to pivotally open automatically (see FIG. 2) to enable a courier to place a package within the interior 116 without the courier having to touch the lid 114. Also upon placement of the package within the interior 116, the lid 114 is operable to pivotally close (see FIG. 1) automatically and the lid locking mechanism 132 is operable to lock automatically to enable a courier to place a package within the interior 116 without the courier having to touch the lid 114. The lid 114 being operable to unlock, open, close and lock automatically for a courier to deliver a package advantageously reduces the amount of time for a courier to deliver a package and increases the security of the lock box from potential theft.

The lid locking mechanism 132 may be configured with a timer (not shown) that automatically closes the lid 114 a predetermined period of time after the lid locking mechanism 132 unlocks the lid 114. The predetermined period of time may be calculated to give a courier reasonably sufficient time to place a package within the interior 116 of the lock box 102. For example, the predetermined period of time may be 1 minute, 2 minutes, 3 minutes or more. Alternatively, the lid locking mechanism 132 may include a sensor (not shown), such as a stain gage or other type of weight sensing device, that is capable of determining if an object has been placed within the interior 116 of the lock box 102 prior to the lid locking mechanism 132 closing the lid 114.

Also, upon receipt of a cover unlock signal by the lock box system 100, the cover locking mechanism 130 is operable to unlock automatically to enable the cover 112 to be pivotally opened to enable a user (e.g., a recipient (not shown) to whom the package is being delivered) to access the package within the interior 116. The cover 112 may be swung open (see FIG. 3) manually by using cover handles 174 or may be configured to open automatically.

A bar code scanner 134 may be externally mounted on the lock box 102 of the lock box system 100. In the example illustrated in FIG. 1, the bar code scanner 134 is disposed at the top of the rear section 110, however the bar code scanner 134 may be mounted on other functionally appropriate areas of the lock box 102 as well. The bar code scanner is operable to scan a bar code of a package being delivered to the lock box 102 and to generate a package identification signal based on the scanned bar code.

A motion sensor 136 and a camera 138 may also be externally mounted on the lock box 102 of the lock box system 100. In the example illustrated in FIG. 1, the motion sensor 136 and camera 138 are disposed on the front of the lock box 102, however they may be mounted on other functionally appropriate areas of the lock box 102 as well.

A one or more solar panels 140 may also be externally mounted on the lock box 102 of the lock box system 100. In the example illustrated in FIG. 1, the solar panels 140 are disposed on the top of the lid 114 of the lock box 102, however they may be mounted on other functionally appropriate areas of the lock box 102 as well.

A mail slot 142 for receiving envelopes may be mounted on the lock box 102. In the example illustrated in FIG. 1, the mail slot 142 is disposed on the top of the lid 114 of the lock box 102, however it may be mounted on other functionally appropriate areas of the lock box 102 as well.

A Peltier thermoelectric cooling module 144 or other active cooling system 144 may be mounted on the lock box 102 to actively regulate the temperature of the interior 116. Advantageously, such an active cooling system 144 can protect temperature sensitive packages from being damaged in a hot climate. Such an active cooling system 144 may be powered by a battery (see FIG. 4), electrical power from a building or solar powered with the solar panels 140 on the lock box 102.

In the example illustrated in FIG. 1, the control system application 104 of the lock box system 100 is installed within the memory of a cell phone 106. However, the application 104 may be installed in any appropriate mobile device, such as a lap top computer or an iPad. The control system application 104 is operable by a user and interacts with a user. The application is also operable to establish a communications link 146 between the application 104 and the various components of the lock box 102. By way of non-limiting examples:

- the motion sensor 136 may communicate with the control system application 104 to alert the user of the presence of a courier within a proximity of the lock box 102;
- the camera 138 may communicate with the control system application 104 to provide the user with a picture of a courier, or other person, within a proximity of the lock box; or
- upon a command from the user, the control system application 104 may be operable to transmit the cover unlock signal which unlocks the cover 112.

The control system application 104 may additionally be operable to track packages that are expected to be delivered to the lock box 102 and communicate the tracking information to the user. The application 104 may track such packages by, for example, the application first receiving an input from the user or other source, which identifies a package to be delivered to the lock box and the courier that is being used to deliver the package. The application 104 may then electronically establish a communication link with the tracking system of the courier that is being used to deliver the package. The application 104 may then relay the tracking information associated with the package from the courier's tracking system to the user. Advantageously, the application 104 may be able to track multiple packages being delivered from multiple courier's. The tracking information from the various tracking systems may be conveniently presented to the user from the application 104, rather than the user having to navigate the different tracking systems of each courier individually.

Figure 3:
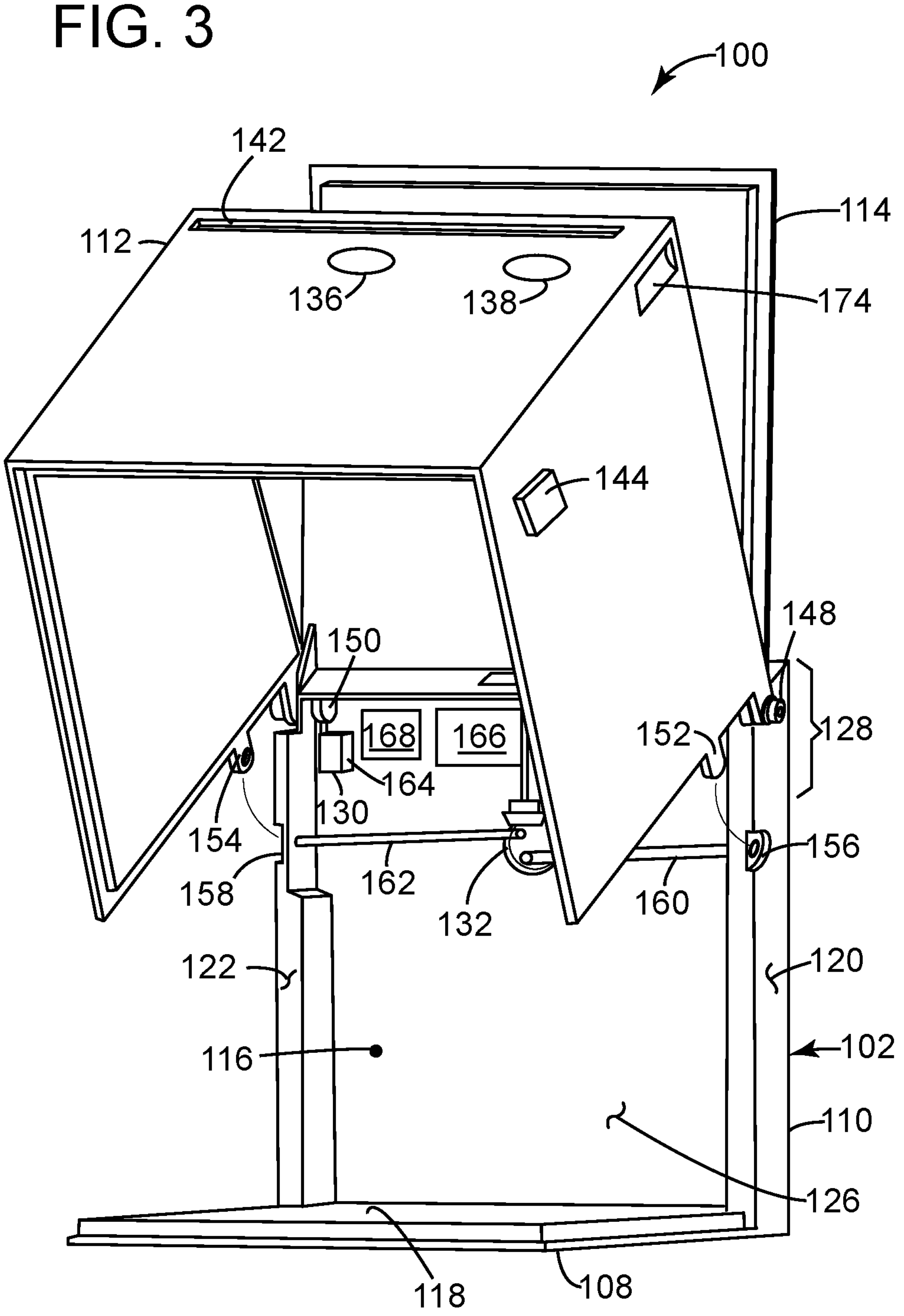
FIG. 3 depicts an example of a perspective view of the lock box system of FIG. 1, wherein the lock box has a side wall cover and the top lid pivotally opened and further has the access cover removed, according to aspects described herein.
Figure 4:
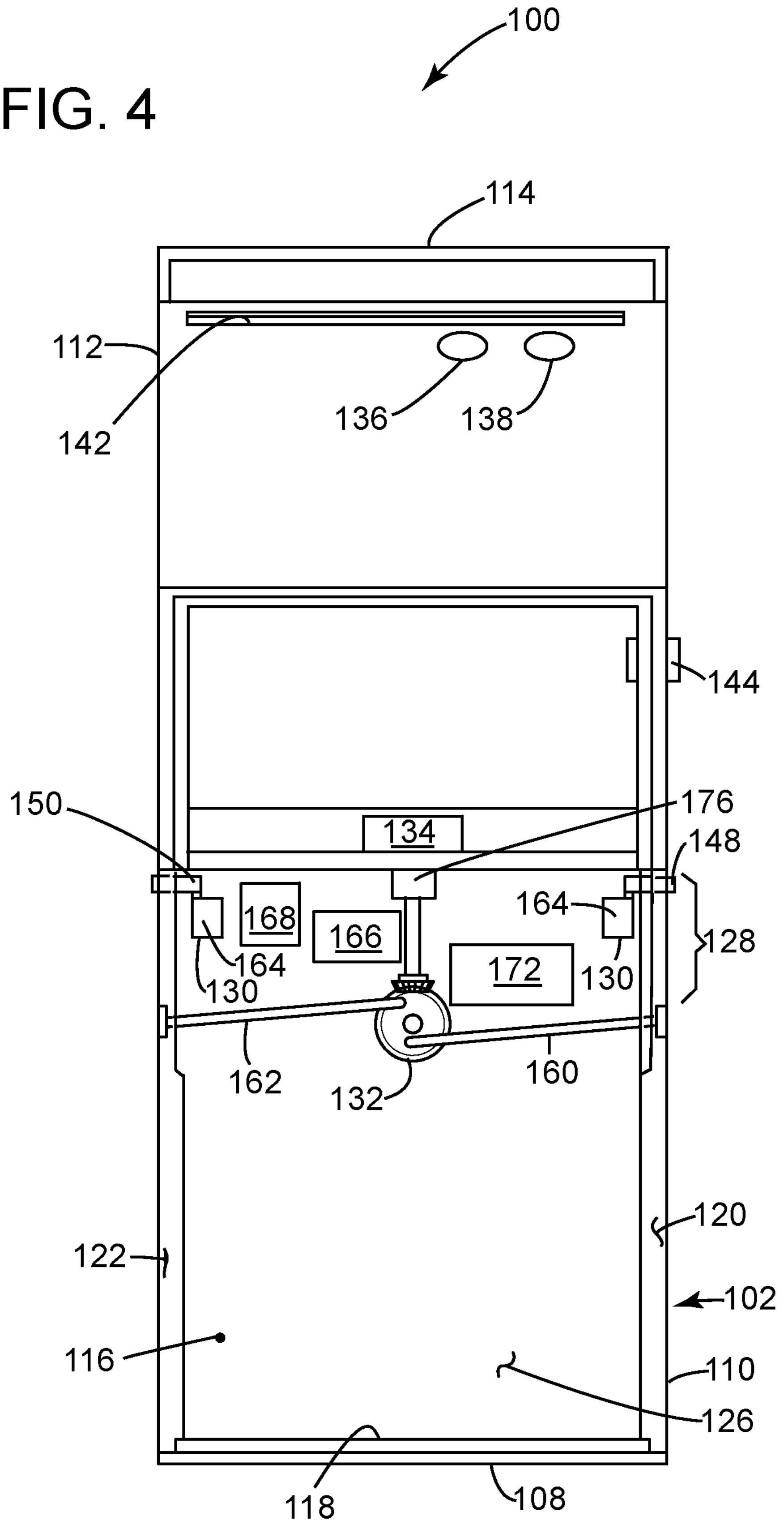
FIG. 4 depicts an example of a front plan view of the lock box of FIG. 3, according to aspects described herein.

Referring to FIGS. 3 and 4, an example is depicted of a perspective view (FIG. 3) and a front plan view (FIG. 4) of the lock box system 100 of FIG. 1, according to aspects described herein. The lock box 102, as illustrated in FIGS. 3 and 4, has the side wall cover 112 and the top lid 114 pivotally opened and further has the access cover 124 removed to reveal the instrumentation within the instrument enclosure area 126.

The rear section 110 of the lock box 102 includes a first hinge 148 and a second hinge 150 disposed respectively on upper portions of the first and second opposing sides 120, 122 of the rear section 110. Advantageously, the lid 114 and cover 112 are both pivotally connected to the first and second hinges 148, 150. Connecting the lid 114 and cover 112 to the same pivot point or the same hinges 148, 150 is advantageous because it allows for maximum height 151 of the cover 112 and, therefore, maximum volume of the cover 112. Further, maximum height 151 of the cover 112 allows for a maximum volume of the interior 116 that is partially defined by the cover 112. In other words, if the lid 114 were hinged above or below the cover 112, the effective height 151 of the cover 112, and therefore the effective height of the interior 116, would be relatively smaller than it could be. By hinging the cover 112 and lid 114 to the same pivot points and/or hinges 148, 150, the cover 112 would be able to swing away from proportionally larger packages disposed within the interior 116 without bumping up against the packages and potentially damaging the packages. This would advantageously allow a user easier access to such larger packages, rather than having to force fit the user's hands between the inner walls of the interior 116 and the package, in order to pull the package out through the opening at the top of the locked cover 112 that is exposed when the lid 114 is open (i.e., the opening through which packages are inserted when a courier delivers the package into the interior 116 when the lid 114 is open).

It is also advantageous that the cover 112 removably abuts against a perimeter of the floor 118 of the base 102, for substantially the same reasons that it is advantageous to have the cover 112 and lid 114 pivotally connected to the same hinges 148, 150 at the upper portion 128 of the rear section 110 of the lock box 102. In other words, the lower end of the cover 112 removably abutting against the floor 118 of the base 102 maximizes the height 151 of the cover 112 and, therefore, maximizes the volume of the interior 116.

In the example illustrated in FIGS. 3 and 4, the cover 112 includes three sidewalls integrally connected together at substantially right angles. However, the cover 112 can be any functionally appropriate shape. By allowing the cover 112 to pivot open, a user can more easily access the packages within, rather than having to reach in thought the top of the lock box 102 when the lid 114 is open.

The cover 112, in the example illustrated, includes a first locking tab 152 and a second locking tabs 154, which extend respectively from opposing rear sides of the cover 112. The first and second locking tabs 152, 154 are configured to slidably fit into a first locking recess 156 and a second locking recesses 158, which are disposed respectively on the first and second opposing sides 120, 122 of the rear section 110 of the lock box 102.

The cover locking mechanism 130 may be disposed in the instrument enclosure area 126 of the interior 116. The cover locking mechanism 130 includes a first retractable locking pin 160 and a second opposing retractable locking pin 162. When the first and second locking tabs 152, 154 are fit within the first and second locking recesses 156, 158, the first and second locking pins 160, 162 are operable to extend through thru-holes in the first and second locking recesses 156, 158 and to extend through thru-holes in the first and second locking tabs 152, 154 to lock the cover 112 to the rear section 110 and the base 102 (see FIG. 3). Upon receipt of the cover unlock signal by the lock box system 100, the first and second locking pins 160, 162 are operable to retract from the thru-holes in the first and second locking tabs 152, 152 to unlock the cover 112 from the rear section 110 and the base 102 (see FIG. 4). The first and second locking pins 160 and 162 may be retracted via operation of motor 176, which may be part of the cover locking mechanism 130.

Once unlocked, a user can lift cover 112 by hand to gain access to the packages within the interior 116 of the lock box 102. Alternatively, the cover 112 may be designed to open automatically.

In the example illustrated in FIGS. 3 and 4, the lid locking mechanism 132 includes one or more motors 164 that may be disposed within the instrument enclosure area 126 of the interior 116. The motor 164 is operable to automatically open the lid 114 upon receipt of the lid unlock signal by the lock box system 100. The motor 164 may be a servo motor, a stepper motor, or the like.

A microprocessor 166 may be disposed within the instrument enclosure area 126 of the interior 116 of the lock box 102. The microprocessor 166 may generate and/or process all control signals from the instrumentation within the lock box 102. For example, the microprocessor 166 may be electrically connected to the bar code scanner 134, motion sensor 136, camera 138, Peltier thermoelectric cooling module and any other instrument that may be disposed in the lock box 102. The microprocessor 166 is operable to receive the package identification signal from the bar code scanner 134 and to generate the lid unlock signal based on the package identification signal. The lid unlocking signal may then activate the motor 164 to unlock and open the lid 114.

The microprocessor 166 may control all functionality of the various instruments within the lock box 102 to provide added security, reduce electrical consumption and provide added features advantageous to the user. For example, the microprocessor 166 may control the Peltier thermoelectric cooling module 144 such that it operates when a package is delivered that is determined by the bar code identification signal generated by the bar code scanner 134 to be temperature sensitive. Accordingly, temperature sensitive items (such as chocolates) may be cooled by the Peltier thermoelectric cooling module 144 controlled by the microprocessor 166 when they are placed in the lock box 102. However, the microprocessor 166 may deactivate the Peltier thermoelectric cooling module (or other active cooling device) when only non-temperature sensitive items (such as paper documents) are determined by the microprocessor 166 to be within the interior 116 of the lock box 102 in order to conserve on electric power consumption.

A radio transmitter 168, such as a Bluetooth radio transmitter and receiver, may also be disposed within the interior 116 of the lock box 102. The radio transmitter 168 is electrically connected to the microprocessor 166. Accordingly, the control system application 104 on the cell phone 106 may be operable to establish the communications link 146 between the control system application 104 and the radio transmitter 168 and microprocessor 166 of the lock box 102. Therefore, upon a command from the user, the control system application 104 may be operable to transmit the cover unlock signal through the radio transmitter 168 and to the microprocessor 166, to unlock the cover 112.

Additionally, through radio transmitter 168, the control system application 104 may provide the user with pictures taken by camera 138 of the courier, of other individual, within the proximity of the lock box 102. Alternatively, the motion sensor 136 may also communicate with the control system application 104 via the radio transmitter 168, to alert the user of the presence of a courier, or other individual, within the proximity of the lock box 102.

A battery 172 may be disposed within the instrument enclosure area 126 of the interior 116 of the lock box 102. The battery may be used to supply power to the instrumentation and or other electrical devices within the lock box 102. For example, the battery 172 may supply electrical power to the microprocessor 166, bar code scanner 134, motion sensor 136, camera 138, Peltier thermoelectric cooler module 144, radio transmitter 168, motor 164, motor 176 or the like. Alternatively, the solar panels 140 may also supply electrical power to the same instrumentation and/or electrical devices. The battery 172 and solar panels 140 may work in conjunction with each other or separately.

Figure 5:
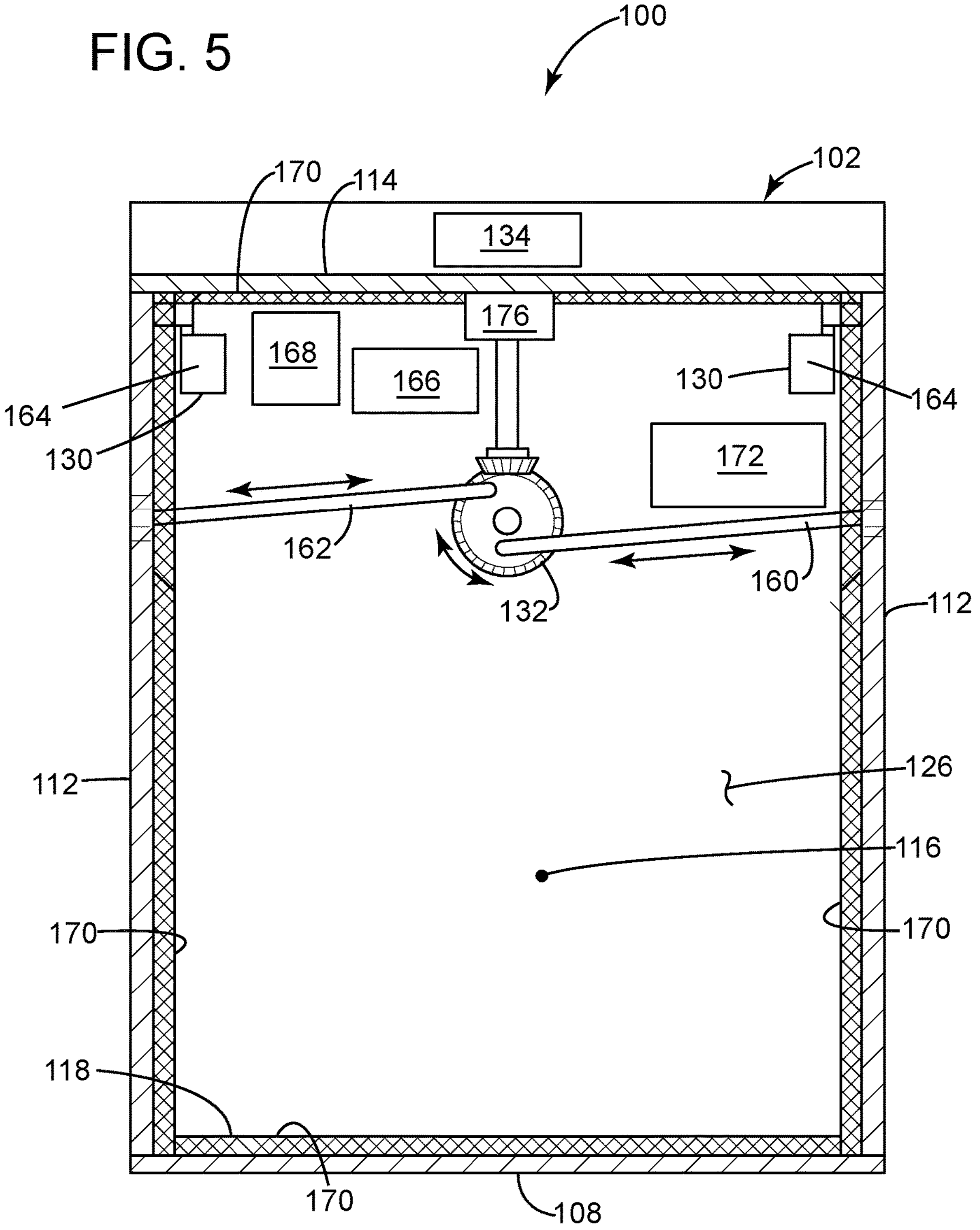
FIG. 5 depicts an example of a cross-sectional view of the lock box of FIG. 1, taken along the cross-sectional line 5-5 in FIG. 1, according to aspects described herein.

Referring to FIG. 5, an example is depicted of a cross-sectional view of the lock box 102 of FIG. 1, taken along the cross-sectional line 5-5 in FIG. 1, according to aspects described herein. In addition to an active cooling system, such as with a Peltier thermoelectric cooler module 144, the lock box 102 may be insulated with an appropriate insulation 170, such as cellulose or the like. In the example illustrated in FIG. 5, the base 102, rear section 110, side wall cover 112 and lid 114 are all insulated with an insulation 170. However not all of these structures need to be insulated in order to provide protection against overheating. For example, the base 102 may not be insulated. Alternatively, other structures within the lock box 102 may be insulated, as for example, the access panel 124 may be insulated with insulation 170 in order to further protect the items delivered to the lock box 102 from the heat generated by instruments disposed within the instrument enclosure area 126 of the rear section 110 of the lock box 102.

In addition to the features and functions described in the foregoing disclosure, the lock box system 100 may include and/or be capable of performing several other advantageous features and functions. By way of examples, and without limitation, the lock box system 100 may be operable to:

- Be able to alert the user via the control system application 104 of an unauthorized attempt to open the lock box 102.
- Take videos of both authorized and unauthorized persons in the proximity of the lock box 102 and show them in real time to a user.
- Establish, via the control system application 104, remote voice and/or video communications between a remotely located user/recipient of a package and a courier delivering the package to the lock box 102.
- Alert the user, via the control system application 104, when the lock box 102 is opened, via bar code scan of the bar code scanner 134, to receive an expected package.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A lock box system comprising a lock box, the lock box comprising:

a base comprising a bottom floor of an enclosed interior of the lock box;

a rear section extending upwards from the base, the rear section having first and second opposing sides;

a side wall cover removably abutting against a perimeter of the floor of the base, the cover removably abutting against the first and second opposing sides of the rear section and the cover pivotally attached to an upper portion of the rear section;

a cover locking mechanism operable to lock the cover to the base and the rear section;

a top lid sized to removably fit over a top portion of the cover, the lid pivotally attached to the upper portion of the rear section; and a lid locking mechanism operable to lock the top lid to the cover;

a microprocessor disposed within the interior of the lock box, the microprocessor electrically connected to the cover locking mechanism and the lid locking mechanism;

wherein the base, rear section, side wall cover and lid define the enclosed interior of the lock box of the lock box system, the interior configured to received packages therein;

wherein upon receipt of a lid unlock signal generated by the microprocessor of the lock box system, the lid locking mechanism is operable to unlock automatically and the lid is operable to pivotally open automatically to enable a courier to place a package within the interior without the courier having to touch the lid; and wherein upon receipt of a cover unlock signal generated by the microprocessor of the lock box system, the cover locking mechanism is operable to unlock automatically to enable the cover to be pivotally opened to enable a user to access the package within the interior.

2. The lock box system of claim 1, wherein upon placement of the package within the interior, the lid is operable to pivotally close automatically and the lid locking mechanism is operable to lock automatically without the courier having to touch the lid.

3. The lock box system of claim 1, comprising:

the rear section including first and second hinges disposed respectively on the first and second opposing sides of the rear section, and the first and second hinges also disposed on the upper portion of the rear section; and wherein the lid and cover are both pivotally connected to the first and second hinges.

4. The lock box system of claim 1, wherein the lid locking mechanism comprises a motor, the motor operable to automatically open the lid upon receipt of the lid unlock signal by the lock box system.

5. The lock box system of claim 1, wherein:

the cover comprising first and second locking tabs extending respectively from opposing rear sides of the cover, the first and second locking tabs configured to slidably fit into first and second locking recesses disposed respectively on the first and second opposing sides of the rear section; and the cover locking mechanism comprising first and second opposing retractable locking pins, wherein:

when the first and second locking tabs are fit within the first and second locking recesses, the first and second locking pins are operable to extend through thru-holes in the first and second locking recesses and to extend through thru-holes in the first and second locking tabs to lock the cover to the rear section and the base, and upon receipt of the cover unlock signal by the lock box system, the first and second locking pins are operable to retract from the thru-holes in the first and second locking tabs to unlock the cover from the rear section and the base.

6. The lock box system of claim 1, comprising:

a bar code scanner disposed on the lock box of the lock box system, the bar code scanner operable to scan a bar code of the package and to generate a package identification signal based on the scanned bar code;

the microprocessor electrically connected to the bar code scanner;

wherein the microprocessor is operable to receive the package identification signal and to generate the lid unlock signal based on the package identification signal.

7. The lock box system of claim 6, comprising:

a radio transmitter disposed within the interior of the lock box, the radio transmitter electrically connected to the microprocessor;

a computerized mobile device having a memory; and a control system application installed within the memory of the mobile device and operable by the user, the control system application operable to establish a communications link between the control system application, the radio transmitter and the microprocessor;

wherein, upon a command from the user, the control system application is operable to transmit the cover unlock signal to the microprocessor to unlock the cover.

8. The lock box system of claim 7, comprising:

a motion sensor disposed on the lock box and electrically connected to the microprocessor;

wherein the motion sensor communicates with the control system application to alert the user of the presence of a courier within a proximity of the lock box.

9. The lock box system of claim 7, comprising:

a camera disposed on the lock box and electrically connected to the microprocessor;

wherein the camera communicates with the control system application to provide the user with a picture of a courier within a proximity of the lock box.

10. The lock box system of claim 1, wherein the lock box is insulated.

11. The lock box system of claim 10, wherein the base, rear section, side wall cover and lid are insulated.

12. The lock box system of claim 1, comprising:

an active cooling system disposed on the lock box, wherein the active cooling system actively regulates the temperature of the enclosed interior of the lock box.

13. The lock box system of claim 12, wherein the active cooling system comprises a Peltier thermoelectric cooling module.

14. The lock box system of claim 13, wherein the Peltier thermoelectric cooling module is solar powered.

15. A lock box system comprising a lock box, the lock box comprising:

a rectangular base comprising a bottom floor of an enclosed interior of the lock box;

a rear section extending upwards from the base, the rear section having first and second opposing sides;

a side wall cover comprising three side walls integrally connected together, the cover removably abutting against a perimeter of the floor of the base, the cover removably abutting against the first and second opposing sides of the rear section and the cover pivotally attached to an upper portion of the rear section;

a cover locking mechanism operable to lock the cover to the base and the rear section;

a top lid sized to removably fit over a top portion of the cover, the lid pivotally attached to the upper portion of the rear section; and a lid locking mechanism operable to lock the top lid to the cover;

a microprocessor disposed within the interior of the lock box, the microprocessor electrically connected to the cover locking mechanism and the lid locking mechanism;

wherein the base, rear section, side wall cover and lid define the enclosed interior of the lock box of the lock box system, the interior configured to received packages therein; and wherein upon receipt of a cover unlock signal generated by the microprocessor of the lock box system, the cover locking mechanism is operable to unlock automatically to enable the cover to be pivotally opened to enable a user to access the package within the interior.

16. The lock box system of claim 15, wherein:

upon receipt of a lid unlock signal generated by the microprocessor of the lock box system, the lid locking mechanism is operable to unlock automatically and the lid is operable to pivotally open automatically to enable a courier to place the package within the interior without the courier having to touch the lid; and upon placement of the package within the interior, the lid is operable to pivotally close automatically and the lid locking mechanism is operable to lock automatically without the courier having to touch the lid.

17. The lock box system of claim 16, comprising:

a bar code scanner disposed on the lock box of the lock box system, the bar code scanner operable to scan a bar code of the package and to generate a package identification signal based on the scanned bar code;

the microprocessor electrically connected to the bar code scanner;

wherein the microprocessor is operable to receive the package identification signal and to generate the lid unlock signal based on the package identification signal.

18. The lock box system of claim 15, comprising:

the rear section including first and second hinges disposed respectively on the first and second opposing sides of the rear section, and the first and second hinges also disposed on the upper portion of the rear section; and wherein the lid and cover are both pivotally connected to the first and second hinges.

19. The lock box system of claim 15, wherein the lock box is insulated.

20. The lock box system of claim 15, comprising a Peltier thermoelectric cooling module configured to actively cool the interior of the lock box.

* * * * *